(12) United States Patent
Niu et al.

(10) Patent No.: US 10,759,963 B2
(45) Date of Patent: *Sep. 1, 2020

(54) PRE-TREATMENT COATING COMPOSITIONS

(71) Applicant: Hewlett-Packard Development Company, L.P., Fort Collins, CO (US)

(72) Inventors: Bor-Jiunn Niu, San Diego, CA (US); Jason Swei, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/073,389

(22) PCT Filed: Jun. 16, 2016

(86) PCT No.: PCT/US2016/037872
§ 371 (c)(1),
(2) Date: Jul. 27, 2018

(87) PCT Pub. No.: WO2017/217997
PCT Pub. Date: Dec. 21, 2017

(65) Prior Publication Data
US 2019/0048225 A1    Feb. 14, 2019

(51) Int. Cl.
*C09D 175/04* (2006.01)
*C09D 7/40* (2018.01)
(Continued)

(52) U.S. Cl.
CPC .......... *C09D 175/04* (2013.01); *B41M 5/0017* (2013.01); *B41M 5/0047* (2013.01);
(Continued)

(58) Field of Classification Search
CPC .... B31B 50/00; C09D 191/06; B41M 5/0011; B41M 5/0017
(Continued)

(56) References Cited

U.S. PATENT DOCUMENTS 6,066,379 A    5/2000  Ma et al.
6,165,593 A   12/2000  Brault et al.
(Continued)

FOREIGN PATENT DOCUMENTS

CN    101717596    6/2010
JP    2007136734   6/2007
JP    2012206520  10/2012

OTHER PUBLICATIONS

Lubrizol, Surface Modifiers Product Guide (Year: 2017).*
International Search Report dated Feb. 14, 2017 for PCT/US2016/037872, Applicant Hewlett-Packard Development Company, L.P.

*Primary Examiner* — Betelhem Shewareged
(74) *Attorney, Agent, or Firm* — Thorpe North & Western LLP (57) ABSTRACT

The present disclosure provides pre-treatment compositions and related methods. As such, a pre-treatment coating composition can include an evaporable liquid vehicle and a pre-treatment coating matrix. The pre-treatment coating matrix can include from 5 wt % to 40 wt % multivalent metal salt, and from 5 wt % to 20 wt % polyurethane. The composition can further include from 10 wt % to 50 wt % high Tg latex having a Tg greater than 80° C., from 0.5 wt % to 20 wt % water soluble binder, and from 3 wt % to 20 wt % wax having a melting point greater than 120° C. The weight percentages of the pre-treatment coating matrix exclude the evaporable liquid vehicle content, and the weight ratio of the high Tg latex to polyurethane is from 1:1 to 5:1.

18 Claims, 2 Drawing Sheets

(51) Int. Cl.
  *C09D 7/65* (2018.01)
  *C09D 7/63* (2018.01)
  *B41M 5/00* (2006.01)
  C08L 91/06 (2006.01)
  C09D 7/61 (2018.01)
  C08K 3/16 (2006.01)

(52) U.S. Cl.
  CPC .............. *C09D 7/63* (2018.01); *C09D 7/65* (2018.01); *C09D 7/68* (2018.01); *C09D 7/69* (2018.01); *B41M 5/0035* (2013.01); *C08K 3/16* (2013.01); *C08K 2003/162* (2013.01); *C08L 91/06* (2013.01); *C09D 7/61* (2018.01)

(58) Field of Classification Search
  USPC ...................................... 428/32.34
  See application file for complete search history.

(56) References Cited

U.S. PATENT DOCUMENTS

| | | |
|---|---|---|
| 8,220,899 B2 | 7/2012 | Kato et al. |
| 8,562,126 B1 | 10/2013 | Xiang et al. |
| 8,765,852 B1 * | 7/2014 | Swei ................ C09D 133/08 524/277 |
| 8,851,652 B2 | 10/2014 | Sarkisian et al. |
| 9,248,685 B2 | 2/2016 | Weihs et al. |
| 2004/0163768 A1 * | 8/2004 | Nowicki ................ B31B 50/00 156/379.6 |
| 2005/0282930 A1 * | 12/2005 | Fu ........................ C09D 11/322 523/160 |
| 2013/0293647 A1 | 11/2013 | Dannhauser et al. |
| 2014/0292951 A1 | 10/2014 | Ferrar et al. |

\* cited by examiner

PRE-TREATMENT COATING COMPOSITIONS

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing technology involves forcing the ink drops through small nozzles by thermal ejection or piezoelectric pressure or oscillation onto the surface of a media. Though inkjet printing is versatile, with certain types of harsh printing and processing applications, there can be challenges related to inkjet or digital printing technology.

BRIEF DESCRIPTION OF THE DRAWINGS

Additional features and advantages of the disclosure will be apparent from the detailed description which follows, taken in conjunction with the accompanying drawings, which together illustrate, by way of example, features of the invention; and, wherein.

Reference will now be made to several examples that are illustrated herein, and specific language will be used herein to describe the same. It will nevertheless be understood that no limitation of the scope of the disclosure is thereby intended.

DETAILED DESCRIPTION

With printed packaging, particularly where corrugation is used, achieving and retaining acceptable print quality using inkjet printing technologies can present challenges. For example, packaging prints can be prepared using printing techniques, such as lithographic sheet printing with a lamination process to generate a corrugated board or flexographic printing that subsequently goes through a corrugation device or corrugator. Lithographic prints can be of high quality but the lamination process can be slow and with narrower media widths. Flexographic printing with subsequent corrugation can provide faster speeds and can provide wider corrugator widths. However, the process of corrugation used with flexographic printing and corrugation can be very harsh, and thus, is not easily transferable to some other types of printing, e.g., the corrugation process can include dragging a print surface over hot plates with temperatures ranging from about 300° F. to 400° F.

Inkjet or digital printing can bring processing advantages to packaging printing, including corrugated packaging printing. For example, with analog printing such as lithographic or flexographic printing, for practical purposes, every image utilizes a specific plate, resulting in higher printing cost for small volume printing job. On the other hand, with digital printing, every image can be different. This allows for any level of versioning or customization of a packaging print job. As commercial papers on the market are designed for lithographic or flexographic printing, in order to leverage these existing types of commercial paper, coatings can be applied to these commercial papers to make them inkjet or digital printing friendly. However, with the very harsh conditions that exist with corrugators, many coatings that might otherwise be acceptable for receiving ink may not be suitable for use under such conditions. In other words, for inkjet printing to be a suitable substitute printing technique in the packaging printing space, coating layers can be prepared to withstand the harsh conditions of the corrugators in accordance with the present technology.

In accordance with this, a pre-treatment coating composition which is suitable for coating on a print medium can include an evaporable liquid vehicle, and a pre-treatment coating matrix. The pre-treatment coating matrix can include from 5 wt % to 40 wt % multivalent metal salt, and from 5 wt % to 20 wt % polyurethane (e.g., an aromatic polyurethane or an aliphatic polyurethane). The pre-treatment coating matrix can also include from 10 wt % to 50 wt % high Tg latex having a Tg greater than 80° C., from 0.5 wt % to 20 wt % water soluble binder, and from 3 wt % to 20 wt % wax having a melting point greater than 120° C., and in some examples greater than 140° C. In accordance with this example, the weight ratio of the high Tg latex to polyurethane can be from 1:1 to 5:1, or from 2:1 to 5:1. Notably, the weight percentages of the pre-treatment coating matrix exclude the evaporable liquid vehicle content.

In another example, a print medium can include a media substrate and a pre-treatment coating matrix applied to the media substrate. The pre-treatment coating matrix can include from 5 wt % to 40 wt % multivalent metal salt, and from 5 wt % to 20 wt % polyurethane. The pre-treatment coating matrix can further include from 10 wt % to 50 wt % high Tg latex having a Tg greater than 80° C., from 0.5 wt % to 20 wt % water soluble binder, and from 3 wt % to 20 wt % wax having a melting point greater than 120° C., and in some examples greater than 140° C. In accordance with this example, the weight ratio of the high Tg latex to polyurethane can be from 1:1 to 5:1, or from 2:1 to 5:1. In one specific example, the media substrate can be an offset coated paper. In another example, the media substrate can have a first side and a second side, wherein the first side can be coated with the pre-treatment coated matrix, and wherein the second side can be attached to a first side of a corrugated flute. In still another example, a base paper can be attached to a second side of the corrugated flute. In yet another example, ink-printed matter can be applied to the pre-treatment coated matrix, and a varnish overcoat can be applied over the ink-printed matter and the pre-treatment coated matrix.

In another example, a method of preparing printed and corrugated packaging can include coating a first side of media substrate with a pre-treatment coating composition, the pre-treatment coating composition, including evaporable liquid vehicle, multivalent metal salt, polyurethane, high Tg latex having a Tg greater than 80° C., water soluble binder, and wax having a melting point greater than 120° C., and in some instances greater than 140° C. In accordance with this example, the weight ratio of the high Tg latex to polyurethane can be from 1:1 to 5:1, or from 2:1 to 5:1. Additional steps can include drying the pre-treatment coating to remove evaporable liquid vehicle therefrom to form a pre-treatment coating matrix applied the first side; applying a printed image on the pre-treatment coating; applying varnish overcoat to the to the printed image and the pre-treatment coating; and applying a first side of a corrugated flute to a second side of the media substrate. In one example, the corrugated flute can further include a base paper applied a second side of the corrugated flute. The method can also include applying pressure to the base paper and applying heat and pressure to the varnish overcoat.

When discussing the present compositions, print media, and methods, each of these discussions can be considered applicable to each of these examples, whether or not they are explicitly discussed in the context of that example. Thus, for example, in discussing a wax in a pre-treatment coating composition, such a wax can also be used in a method of providing a durable coating or to a print medium, and vice versa.

It is noted that the term "pre-treatment coating composition" refers to the composition used to form a "pre-treatment coating matrix." For example, a pre-treatment coating composition includes an evaporable liquid vehicle that evaporates from the solids to leave the pre-treatment coating matrix coated on the media substrate. In accordance with this, the evaporable liquid vehicle is not included in weight percent (wt %) calculations, e.g. dry weight is provided unless the context dictates otherwise.

Regarding the formulations described herein generally, each of the ingredients described can provide a benefit to the various coating layers described herein. For example, in the pre-treatment coating composition or matrix, the multivalent salt act as an ink fixer to contribute to the high image quality by preventing color bleed and other visual artifacts when an aqueous ink is printed thereon. It may also increase image quality by keeping the image close to the surface of the pre-treatment coating. The polyurethane may improve durability by binding the ingredients of the matrix to each other and to the underlying media. The high Tg latex may remain in a particle form and thus may allow ink components to penetrate the matrix, providing a desirable surface morphology for receiving aqueous inkjet ink. By providing a weight ratio of the high Tg latex to polyurethane of from 1:1 to 5:1, surprisingly, improved durability when exposed to hot (e.g., up to 400° F.) and mechanically harsh conditions (e.g., mechanical scraping), such as may be present in corrugators, can be achieved compared to ratios just outside of this ratio range. Furthermore, the wax with the high melting point (greater than 120° C., and in some examples greater than 140° C., or even greater than 150° C.) along with the varnish overcoat described herein, can work together to provide and retain acceptable print quality when a printed side of the packaging is heated and scraped (as often occurs) within a high temperature corrugating device.

In essence, the layers on the imaged or printed side of the packaging media can be prepared withstand high temperatures and scraping often associated with corrugation processes. In one specific example, to a media substrate such as an offset coated media substrate may be applied or coated the pre-treatment coating composition, which is dried to essentially remove evaporable liquid vehicle (usually including evaporable solvent, water, or both) to leave the pre-treatment coating matrix. An image may then be printed thereon using ink printing technologies, such as digital printing/inkjet printing, and dried. Next, a varnish overcoat may be applied and dried on top of the printed image and pre-treatment coating matrix, and in some examples, on top of the entire pre-treatment coating matrix. This type of coated layer system may provide for inkjet printing on standard or offset coated papers with good image quality, and may provide enhanced durability for inkjet printed matter that can survive high temperatures and mechanical forces often present in corrugation packaging applications.

With specific reference to the pre-treatment coating matrix (coated on the media after the evaporable liquid vehicle is removed, e.g., by drying), in some examples, the wax particles may extend in size beyond a thickness of the matrix when applied to the media substrate, e.g., when the evaporable liquid vehicle dries from the surface of the coated media substrate, the wax can extend beyond the coating layer thickness provided by other ingredients. In other words, this structural arrangement can provide some texture to the surface of the printed package and can protect the underlying matrix when the pre-treatment coating contacts other substrates, objects, etc., which is may be further enhanced when varnish overcoat is also used. The resulting effect can be enhanced durability of the pre-treatment coating matrix and printed images that may be printed thereon. Such durability provides retention of the print quality of the printed image, which can be measured by gloss, optical density, color bleed, scratch resistance, coalescence, water smudge, etc.

Figure 1:
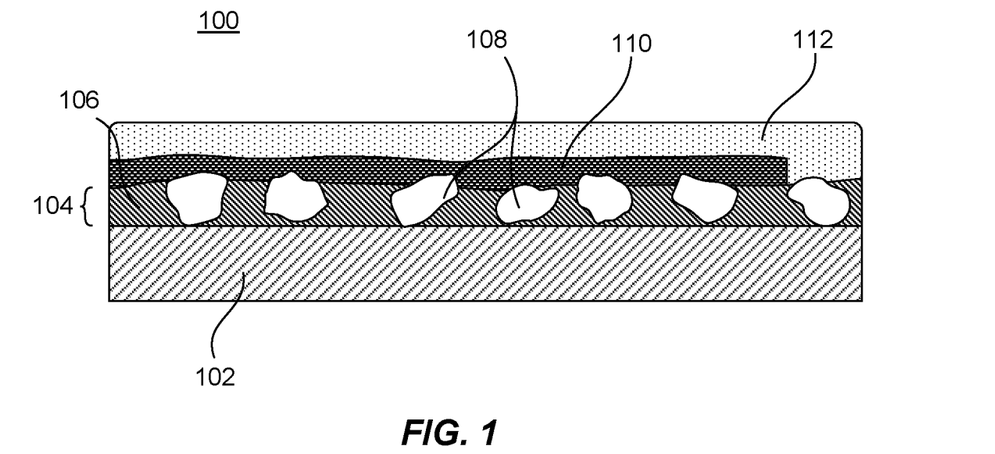
FIG. 1 provides a cross-sectional view of an example pre-treatment coating, printed image, and a varnish overcoat applied to a print medium in accordance with the present disclosure.

Turning to FIG. 1, a print medium 100 can include a media substrate 102 coated with a pre-treatment coating matrix 104. The media substrate can be any substrate suitable for use with packaging, including paper, offset coated paper, or the like. The pre-treatment coating matrix can include embedded wax particles 108. In one example, a portion of the wax particles may extend above the surface of the matrix, and in other examples, the wax particles may not extend beyond the surface of the matrix. For example, the size of a portion of the wax particles can be greater than the thickness of the matrix. In one example, at least 10% of the wax particles can have a particle size greater than the thickness of the matrix. In another aspect, at least 50% of the wax particles can have a particle size greater than the thickness of the matrix. In one specific aspect, at least 90% of the wax particles can have a particle size greater than the thickness of the matrix. In one example, the pre-treatment coating matrix can have a thickness of 100 nm to 100 µm and the wax can have an average particle size of 100 nm to 100 µm. Though these ranges overlap, it is understood that a portion of the wax particles may be larger in size than the thickness of the matrix coated on the media substrate, or in other examples, they may not. Other components that may also be present the pre-treatment coating matrix include, as previously mentioned and described in further detail herienafter, a multivalent salt, a high Tg latex, polyurethane latex, and water soluble binder, which are shown in aggregate at 106.

In further detail regarding the wax particle size, these wax particles can have an average particle size of 100 nm to 100 µm, as mentioned, or in other examples, from 0.5 µm to 50 µm or from 1 µm to 50 µm. In another example, the wax particles can have an average particle size of 5 µm to 50 µm. In still another example, the wax particles can have an average particle size of 5 µm to 12 µm. In one aspect, the wax particles can have an average particle size of 12 µm to 20 µm. In one specific aspect, the wax particles can have an average particle size of about 8 µm. In another aspect, the wax particles can have an average particle size of about 15 µm to 18 µm. When particles are non-spherical, the largest diameter sphere that can be fitted within the particle can be considered D1. The smallest diameter sphere that can completely contain the particle can be considered D2. In one example, the "particle size" can be measured as the average of D1 and D2, which is referred to simply as D. Thus, when referring to "particle size" herein, the particle diameter D can be calculated. "Average particle size," on the other hand, refers to a plurality of particles, each having its own particle size, which are collectively averaged. Additionally, in one example, wax particles can be spread throughout the coating such that the particles have an average spacing S that is at least twice the diameter D of the particles. In one example, the average spacing S is at least 3 times D. In another example, the average spacing S is at least 4 times D.

Additionally the wax particles can be distributed so as to have an area density coverage that is within a specific range. The area density coverage is the percentage of the area of the media covered by the particles. According to this metric, each particle covers a portion of the media that is defined by a cylindrical projection of the particle that is normal to the media. Thus, the area covered would be defined by a circle having the same diameter (D) as the particle. In one example, the area density coverage would be in the range of 0.5% to 30% of the area of the media. In yet a more specific aspect, the area density coverage would be 1% to 10% of the area of the media. Some specific examples of area density coverage would be about 1%, about 4%, about 5% coverage. In general an area coverage density that is above about 30% coverage may begin to adversely impact print quality. An area coverage density below about 0.5% may be insufficient to provide scratch and/or rub resistance of an image printed upon the media.

Generally, the wax particles can be chosen such that the ratio of the wax particle size to the thickness of the pre-treatment coating matrix plus any printed ink thereon is greater than 1. Such a ratio provides that the wax particles extend above the surface of any printing on the pre-treatment coating matrix, thereby protecting the underlying printed image. In one example, the ratio can range from 10:1 to 1.01:1, and in one aspect, can range from 3:1 to 1.01:1. In another specific aspect, the ratio can range from 2:1 to 1.01:1, or even 1.1:1 to 1.01:1. In still other examples, the wax particles can be sized so that they do not extend above the balance of the pre-treatment coating matrix. This may be particularly the case when a varnish overcoat is used where the particles are not used to protect the balance of the pre-treatment coating matrix (the varnish contributes more heavily that function). That being stated, a combination of both large wax particles that extend above the balance of the pre-treatment matrix and varnish overcoat can be used (with printed ink therebetween).

The wax can be selected based on various printing factors such as compatibility, particle size, melting point, etc. As mentioned, higher melting point waxes can withstand a corrugation device with improved integrity. Thus, in one example, the melting point of the wax can be greater than 120° C., or greater than 140° C., or greater than 150° C. Typically, waxes are available as wax emulsions, micronized wax, or wax dispersions. Waxes are commercially available from a number of vendors, for example Keim-Additec, Lubrizol, Michelman, and BYK Chemie. Waxes useful for the present compositions can include but are not limited to: Liquilube™ 411, Liquilube™ 405, Liquilube™ 488, Liquilube™ 443, Liquilube™ 454 from Lubrizol; ME80825, ME48040, ME98040M1, ME61335, ME90842, ME91240, ML160 from Michelman; Ultralube® E-521/20, Ultralube® E-7093, Ultralube® 7095/1, Ultralube® E-8046, Ultralube® D806, Ultralube® E-502V, Ultralube® E-842N from Keim-Additec; Aquacer® 2650, Aquacer® 507, Aquacer® 533, Aquacer® 515, Aquacer® 537, Aquaslip™ 671, Aquaslip™ 942 from Byk; Orgasol® 2001 EXD NAT1, 3501 EXD NAT 1 from Arkema; Slip-ayd® SL300, Slip-ayd® SL1618, Slip-ayd® 295A from Elementis; Mju:wax® 8001 from Ceronas; combinations thereof, or the like.

Wax suspended in water includes, but is not limited to, particles of a synthetic wax, a natural wax, a combination of a synthetic wax and a natural wax, a combination of two or more different synthetic waxes, or a combination of two or more different natural waxes, for example. In some examples, the synthetic wax includes, but is not limited to, polyethylene, polypropylene, polybutadiene, polytetrafluoroethylene, polyvinylfluoride, polyvinyldiene fluoride, polychlorotrifluoroethylene, perfluoroalkoxy polymer, perfluoropolyether, polyethylenechlorotrifluoroethylene, polyethylene-vinyl acetate, epoxy resin, silicone resin, polyamide (e.g., polyamide-12), or polyester. In some examples, the natural wax includes, but is not limited to, carnauba wax, paraffin wax, montan wax, candelilla wax, ouricury wax, sufarcane wax, retamo wax, or beeswax. In one example, the wax can be a polyethylene wax.

Generally, the wax can be present in the pre-treatment coating matrix at a concentration ranging from 5 wt % to 30 wt %, or from 5 wt % to 20 wt %. In another example, the wax can be present ranging from 10 wt % to 20 wt %, and in one aspect, 11 wt % to 17 wt %. It is notable that these weight percentages of the wax are based on a total amount present in the pre-treatment coating matrix after removal of any evaporable liquid vehicle. Thus, they are intended to be weight percentages by solids once the pre-treatment coating matrix is applied to the media substrate and the evaporable liquid vehicle is driven off, i.e. the final wt % on the coated media substrate.

Additionally, the wax emulsions can include compatible binders and dispersants. By compatible, the present waxes can be used without causing aggregation or precipitation of dispersants/binders, particularly over extended periods of time (weeks/months at ambient temperature or days/weeks at elevated temperature such as 40° to 65° C.). Incompatibility can manifest itself by increases in wax particle size, phase separation of wax, or creaming at a faster rate than in the absence of destabilizing materials.

As discussed herein, the matrix generally also includes other solids also found in the pre-treatment coating composition. The evaporable liquid vehicle is not part of the matrix, as it is removed from the pre-treatment coating composition after application to the media substrate. The evaporable liquid vehicle can include or be water, organic co-solvent, and/or other liquids that can be removed after application.

The pretreatement coating composition or matrix also may include a multivalent salt and multiple latexes, and can also include a water soluble binder. In some examples, surfactant and/or defoamer may be present. Like the wax, it is notable that the matrix weight percentages herein are based on a total amount present in the pre-treatment coating matrix after removal of any evaporable liquid vehicle from the coating composition. Thus, the weight percentages are intended to be weight percentages by solids once the pre-treatment coating composition is applied to the media substrate and the evaporable liquid vehicle is driven off, e.g., the final wt % on the coated media substrate, which is the case whether discussed in the context of the coating composition or the finished coating matrix.

In further detail, a multivalent metal salt can be present as a fixing agent. The multivalent metal salt can include a divalent or a higher multivalent metallic ion and anion. In one example, the multivalent metal salt components can be soluble in water. Examples of multivalent metallic ions include divalent metallic ions, such as $Ca^{2+}$, $Cu^{2+}$, $Ni^{2+}$, $Mg^{2+}$, $Zn^{2+}$ and $Ba^{2+}$; and trivalent metallic ions, such as $Al^{3+}$, $Fe^{3+}$ and $Cr^{3+}$. In one example, the multivalent metallic ion can be $Ca^{2+}$, $Mg^{2+}$ or $Zn^{2+}$. In one aspect, the multivalent metallic ions can be $Ca^{2+}$. Examples of anions include $Cl^-$, $I^-$, $Br^-$, $NO_3^-$ or $RCOO^-$ (where R is H or any hydrocarbon chain). In one example, the multivalent metal salt anion can be a chloride ($Cl^-$) or acetate ($CH_3COO^-$). In other examples, the multivalent metal salt can include divalent or other multivalent metallic ions and nitrate or carboxylate ions. The carboxylate ions can be derived from a saturated aliphatic monocarboxylic acid having 1 to 6 carbon atoms or a carbocyclic monocarboxylic acid having 7 to 11 carbon atoms. Examples of saturated aliphatic monocarboxylic acid having 1 to 6 carbon atoms may include formic acid, acetic acid, propionic acid, butyric acid, isobutyric acid, valeric acid, isovaleric acid, pivalic acid, and/or hexanoic acid.

In one example, multivalent metal salt can include calcium chloride, calcium nitrate, magnesium nitrate, magnesium acetate, and/or zinc acetate. In one aspect, the multivalent metal salt can be calcium chloride or calcium nitrate ($CaCl_2$ or $Ca(NO_3)_2$). In one additional specific aspect, the multivalent metal salt can be calcium chloride ($CaCl_2$).

Generally, the multivalent metal salt present in the pre-treatment coating matrix at a concentration ranging from 5 wt % to 20 wt %, based on the solids content after the solvent has been removed. In another example, the fixer can be present in an amount ranging from 5 wt % to 15 wt %, and in one aspect, 10 wt % to 20 wt %. It is understood that these ranges are not intended to be limiting and that the amounts can be adjusted for the desired application.

In addition to the above, the matrix can include a high Tg latex having a Tg greater than 80° C., in combination with a polyurethane latex. These latexes, in combination, can provide increased durability. In accordance with examples of the present disclosure, it has been found that a weight ratio of the high Tg latex to polyurethane can be from 1:1 to 5:1, or from 2:1 to 5:1, which provides improved hot durability performance, such as found in corrugators, compared to the presence of these two latexes when included outside of this range. As used herein, "latex" can be used interchangeable with "latex particle" and refer to polymeric masses that are dispersed in a fluid. However, it is understood that when the pre-treatment coating composition is dried, the liquid or solvents is generally driven off and the solids are what remain with the print media as part of the pre-treatment coating matrix, e.g., solids of the high Tg latex and solids of the polyurethane.

In one example, the high Tg latex can comprise polymers or copolymers including acrylic polymers or copolymers, vinyl acetate polymers or copolymers, polyester polymers or copolymers, vinylidene chloride polymers or copolymers, butadiene polymers or copolymers, acrylonitrile-butadiene polymers or copolymers. In another example, the latex particle can include a vinyl acetate-based polymer, an acrylic polymer, a styrene polymer, a styrene-butadiene (SBR)-based polymer, a polyester-based polymer, a vinyl chloride-based polymer, an acid-based polymer, or the like. In one aspect, the latex particle can be a polymer or a copolymer including acrylic polymers or vinyl-acrylic copolymers and acrylic-polyurethane copolymers. In another aspect, the latex particle can be cationic acrylate latex. In one specific aspect, the latex can be a vinyl acetate polymer.

Generally, latex particles (including the high Tg latex as well as the polyurethane) can have a weight average molecular weight (Mw) of 5,000 Mw to 500,000 Mw. In one example, the latex particles can range from 150,000 Mw to 300,000 Mw. In some examples, the average particle size of the latex particles can be from 10 nm to 1 µm and, as other examples, from 10 nm to 500 nm, and in yet other examples, from 50 nm to 250 nm. The particle size distribution of the latexes is not particularly limited, and either latex having a broad particle size distribution or latex having a mono-dispersed particle size distribution may be used. It is also possible to use two or more kinds of polymer fine particles each having a mono-dispersed particle size distribution in combination.

The glass transition temperature (Tg) of the high Tg latex can be at least 80° C., and in one aspect, can be from 80° C. to 140° C. In one example, the Tg of the high Tg latex can range from 80° C. to 120° C., and in one alternative aspect, can range from 100° C. to 115° C. On the other hand, generally, the Tg of the polyurethane can be below the Tg of the high Tg latex. In one example, the Tg of polyurethane latex binder can be less than about 80° C., e.g., from −25° C. to 80° C. In one aspect, the Tg of the polyurethane can range from −25° C. to 50° C., and in one specific aspect, can range from −25° C. to 0° C. The glass transition temperature (Tg) parameter can be measured by Differential Scanning calorimetry (DSC).

The high Tg latex can be present, by solids content, in the pre-treatment composition (after removal of the solvent) at from 10 wt % to 50 wt %, from 15 wt % to 50 wt %, from 20 wt % to 45 wt %, or from 20 wt % to 35 wt %. The polyurethane can be present, by solids content, in the pre-treatment composition (after removal of the solvent) at from 5 wt % to 20 wt %, from 8 wt % to 20 wt %, from 10 wt % to 20 wt %, or from 10 wt % to 15 wt %.

As mentioned, the matrix can also include a water soluble binder. Examples of suitable binders that can be used include polyvinyl alcohols (including water-soluble PVA copolymers such as copolymers of PVA and poly(ethylene oxide) or copolymers of PVA and polyvinylamine, cationic PVAs, acetoacetylated PVAs, and silyl-modified PVA); polyvinyl acetates; polyvinyl pyrrolidones (including copolymers of polyvinyl pyrrolidone and polyvinyl acetate); starch; modified starch (including oxidized and etherified starches); water soluble cellulose derivatives (including carboxymethyl cellulose and hydroxyethyl cellulose); polyacrylamides (including polyacrylamide derivatives and copolymers); casein; gelatin; soybean protein; conjugated diene copolymers (including maleic anhydride resin and styrene-butadiene copolymer); acrylic polymers (including polymers and copolymers of acrylic and methacrylic acids); vinyl polymers (including ethylene-vinyl acetate copolymers); functional group-modified polymers (including those obtained by modifying the above-mentioned polymers with monomers containing functional groups such as carboxyl, amino, amido, and sulfo groups); cationic polymers, including cationic polyamides; and synthetic resin binders (including polymethyl methacrylate, polyester resin, amide resin, vinyl chloride-vinyl acetate copolymer, polyvinyl butyral, and alkyl resins). In one example, the binder can be starch or modified starch.

The water soluble binder can be included in the pre-treatment coating matrix at a concentration ranging from 0.5 wt % to 20 wt %, based on the solids content of the pre-treatment coating composition after solvent has been removed, also referred to as the pre-treatment coating matrix. In one example, the binder can be present in an amount ranging from 5 wt % to 15 wt %, and in one aspect, 10 wt % to 15 wt %. It is understood that these ranges are not intended to be limiting and that the amounts can be adjusted for the desired application.

Further, the pre-treatment coating composition or matrix may include surfactants. Non-limiting examples of suitable surfactants include nonionic surfactant, cationic surfactant, and combinations thereof. In one example, the surfactant can be a nonionic surfactant. In one aspect, the surfactant can be a nonionic surfactant including nonionic fluorosurfactant, nonionic acetylenic diol surfactant, nonionic ethoxylated alcohol surfactant, and combinations thereof.

Several commercially available nonionic surfactants that can be used in the formulation of the pre-treatment composition include ethoxylated alcohols such as those from the Tergitol series (e.g., Tergitol 15S30, Tergitol 15S9), manufactured by Dow Chemical; surfactants from the Surfynol® series (e.g. Surfynol® 440 and Surfynol® 465), and Dynol™ series (e.g. Dynol™ 607 and Dynol™ 604) manufactured by Air Products and Chemicals, Inc.; fluorinated surfactants, such as those from the Zonyl® family (e.g., Zonyl® FSO and Zonyl FSN surfactants), manufactured by E.I. DuPont de Nemours and Company; Alkoxylated surfactant such as Tege Wet 510 manufactured from Evonik; fluorinated PolyFox® nonionic surfactants (e.g., PF159 nonionic surfactants), manufactured by Omnova; or combinations thereof. Suitable cationic surfactants that may be used in the pre-treatment composition include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

The surfactant, if present, can be included in the pre-treatment composition at from about 0.05 wt % to about 1.5 wt %. In one example, the surfactant can be present in an amount ranging from about 0.1 wt % to about 1 wt %. In one aspect, the surfactant can be present in an amount ranging from about 0.2 wt % to about 0.6 wt %.

Other additives can be added to the pre-treatment matrix including cross-linkers, defoamers, plasticizers, fillers, stabilizers, dispersants, biocides, optical brighteners, viscosity modifiers, leveling agents, UV absorbers, anti-ozonants, etc. Such additives can be present in the pre-treatment compositions in amounts from 0.01 wt % to 20 wt %. Generally, the cross-linker can cross-link the binder.

Returning now to FIG. 1, a printed image 110 is shown. As a note, the printed image can likewise be referred to as printed ink or ink-printed matter. In this example, the printed image can be applied to a portion of the pre-treatment coating matrix 104, which may be the case where some areas may be imaged and other areas remain unprinted with ink or coated with a colorless ink, for example. In one example, the printed image can be a pigment-based printed image, and in other examples, the printed image can be a dye-based printed image. These printed images can be applied by inkjet ink, for example. Such inkjet inks generally can include a colorant dispersed or dissolved in an ink vehicle. As used herein, "ink vehicle" refers to the liquid fluid in which a colorant is placed to form an ink. Ink vehicles are well known in the art, and a wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the ink vehicle per se, in addition to the colorants, the ink vehicle can carry solid additives such as polymers, latexes, UV curable materials, plasticizers, etc.

Generally the colorant discussed herein can include a pigment and/or dye. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics or other opaque particles. In one example, the colorant can be a pigment.

Typical ink vehicle formulations can include water, and can further include co-solvents present in total at from 0.1 wt % to 40 wt %, depending on the jetting architecture, though amounts outside of this range can also be used. Further, additional non-ionic, cationic, and/or anionic surfactants can be present, ranging from 0.01 wt % to 10 wt %. In addition to the colorant, the balance of the formulation can be purified water with other small amounts of other ingredients. In some examples, the inkjet ink may include latex for added durability.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

Returning now to FIG. 1, also shown is a varnish overcoat 112 applied to the printed image 110, and generally also over the pre-treatment coating matrix 104. In this specific example, the varnish overcoat is also applied directly to the pre-treatment coating matrix where ink has not been applied. The varnish overcoat can be used to protect the printed image and the pre-treatment coating matrix; however it is noted that since all three layers can get very hot during corrugation processing, all three layers can be formulated to withstand a relatively high level of heat. Furthermore, in examples where a varnish overcoat is used, it is the varnish overcoat that may come into contact with the hot plate used on the corrugation apparatus. Thus, the varnish overcoat will receive direct hot plate contact and the harshest mechanical contact.

Examples of materials that can be used for the varnish overcoat include polystyrene polymer, polystyrene copolymers, polyacrylate, polystyrene-acrylate copolymers, polyurethane resin, or heat cross-linkable polymers. More specific commercial products that can be used for the varnish overcoat include Digiguard® 100, Thermagloss® 425 from Michelman; Preprint® XDM Gloss OVP 7MKWJ4115 from American Inks and Coatings; or Aquaflex® H.R. Overprint from Fling Group. Suitable thickness for the varnish overcoat can range from 0.5 µm to 5 µm, or from 1 µm to 3 µm, for example.

Figure 2:
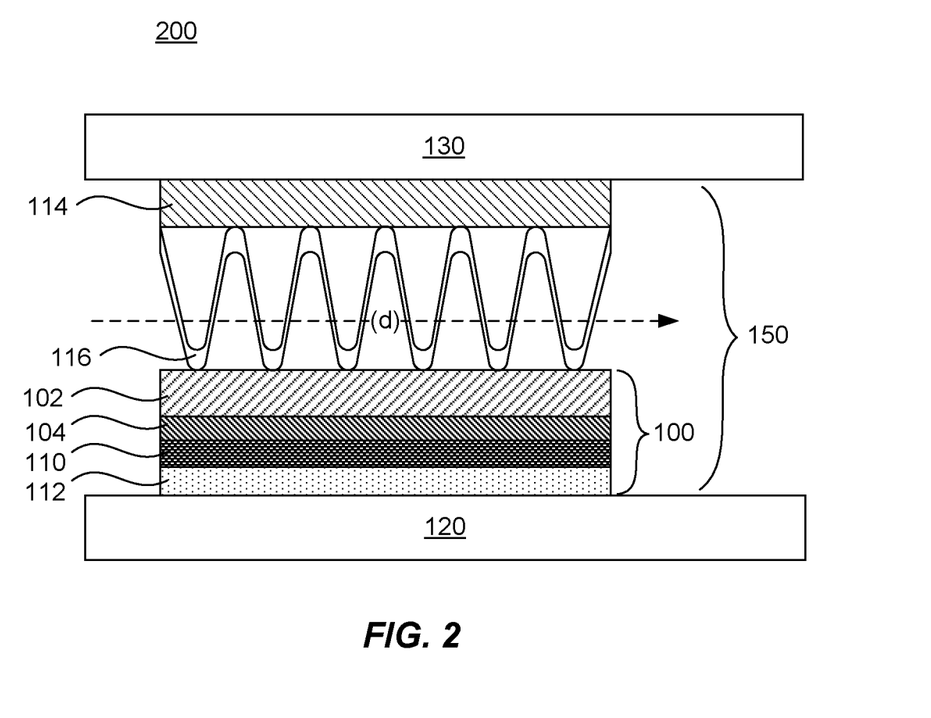
FIG. 2 provides a cross-sectional schematic view of an example corrugated print medium and corrugation system in accordance with the present disclosure.

Turning now to FIG. 2, a system 200 for preparing corrugated packaging 150 is shown, which includes a print medium similar to that shown in FIG. 1, but which is shown inverted at 100 in FIG. 2. Thus, the print medium includes a media substrate 102, a pre-treatment coating matrix 104, a printed image or ink-printed matter 110, and a varnish overcoat 112 as previously described. In this FIG., the system includes two plates, including a heating plate 120, which may apply heat and pressure to an imaged side of the print medium, and a pressure back plate 130, which also cooperates in applying pressure when preparing the corrugated packaging. Under this heat and pressure, a flute 116 and a base paper 114 backing can be attached to a second side or back side of the media substrate. Notably, in this particular system, the corrugated packaging can be moved in direction (d) while under heat and pressure. As a result, the imaged side of the packaging under heat can be scratched or scraped as it moves laterally. The combination of the varnish overcoat, printed image, and pre-treatment coating matrix can be formulated to withstand the heat and pressure that may be applied during the corrugation process.

Figure 3:
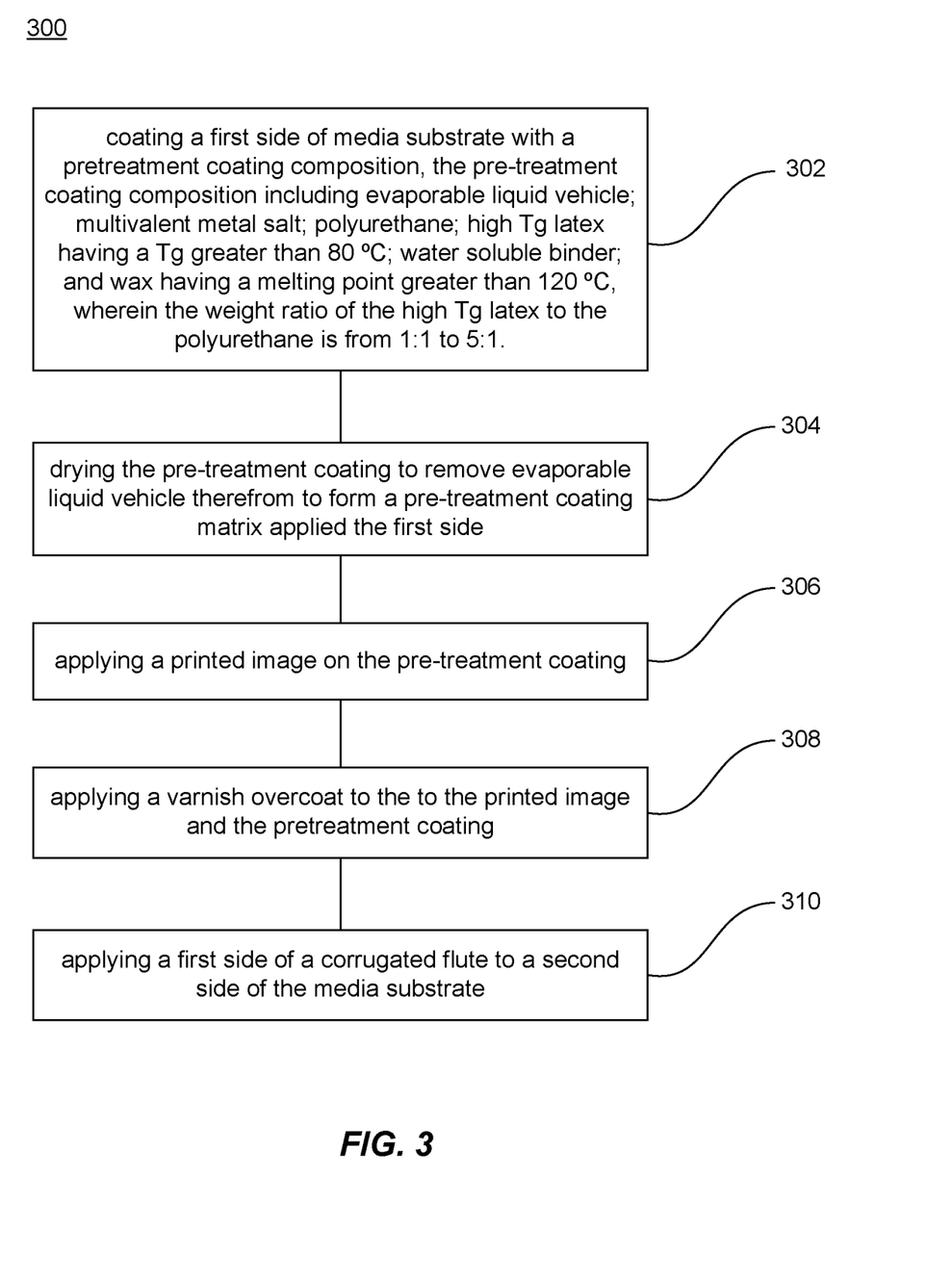
FIG. 3 depicts a flow chart of an example method in accordance with the present disclosure.

Referring to FIG. 3, a method 300 of preparing printed and corrugated packaging can include coating 302 a first side of media substrate with a pre-treatment coating composition, the pre-treatment coating composition including evaporable liquid vehicle; multivalent metal salt; polyurethane; high Tg latex having a Tg greater than 80° C.; water soluble binder; and wax having a melting point greater than 120° C. In accordance with this example, the weight ratio of the high Tg latex to polyurethane can be from 1:1 to 5:1, or from 2:1 to 5:1. Additional steps can include drying 304 the pre-treatment coating composition to remove evaporable liquid vehicle therefrom to form a pre-treatment coating matrix applied the first side; applying 306 a printed image on the pre-treatment coating matrix; applying 308 a varnish overcoat to the to the printed image and the pre-treatment coating matrix; and applying 310 a first side of a corrugated flute to a second side of the media substrate. The corrugated flute can include a base paper positioned on a second side of the corrugated flute.

Methods that can be used to apply the coating compositions generally include flexo coating, roll coating, slot-die coating, rod coating such as Mayer rod coating, blade coating, gravure coating, knife-over-roll coating, cascade coating, curtain coating, and the like. Generally the pre-treatment coating matrix can be applied at a basis weight of 0.1 gsm to 10 gsm. In one example, the basis weight can be from 0.5 gsm to 5 gsm, and in one aspect, from 0.5 gsm to 2 gsm. The printed image can be applied, where applied, at from 0.1 gsm to 5 gsm, for example. The varnish overcoat can be applied at from 1 gsm to 3 gsm, for example. These coating weights are based on dry weight.

The pre-treatment coating compositions and matrices of the present disclosure can be suitable for use on many types of substrates of print media, including but not limited to, paper media, nonporous media, swellable media, microporous media, photobase media, offset media, coated media, uncoated media, and other types of media including plastics, vinyl media, fabrics, woven substrate, etc. In certain examples, the substrate can be swellable media, microporous media, or offset media.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate the pre-treatment coating compositions and matrices, and data associated therewith. However, it is to be understood that the following are only exemplary or illustrative of the application of the principles of the present compositions print media, and methods. Numerous modifications and alternative pre-treatment coating compositions or matrices may be devised by those skilled in the art without departing from the spirit and scope of the present compositions and methods. The appended claims are intended to cover such modifications and arrangements. Thus, while the above has been described with some particularity, the following provides further example details.

Example 1

Five pre-treatment coating compositions were prepared by admixing the ingredients according to Tables 1 in water (evaporable liquid vehicle) to generate a spreadable coating dispersion. The pre-treatment coating compositions were applied to print media via a rod coating process at a basis weight of 1.5 gsm (based on dry components). After coating, the media was dried to remove any solvents, providing a pre-treatment coating matrix with the weight percentages listed in Tables 1 (Pre-treatment Coating Matrices—Samples A-E).

TABLE 1A

Pre-treatment Coating Matrix Coated on Media Substrate

| | Samples | | | | |
|---|---|---|---|---|---|
| | A wt % | B wt % | C wt % | D wt % | E wt % |
| Raycat ® 78 (High Tg Latex) | 46.7 | 45.3 | 43.0 | 34.5 | 41.0 |
| Mowiol ® 4-88 (Water Soluble Binder) | 7.5 | 8.4 | 8.0 | 9.2 | 7.6 |
| Mowiol ® 13-88 (Water Soluble Binder) | 3.7 | 4.2 | 4.0 | 4.6 | 3.8 |
| Sancure ® 20041 (Polyurethane) | 9.3 | 5.3 | 10.0 | 11.5 | 14.3 |
| Orgasol ® 2001 EX D NAT (Wax) | 9.3 | 10.5 | 10.0 | 11.5 | 9.5 |
| $CaCl_2$ (Multivalent Salt) | 20.6 | 23.2 | 22.0 | 25.3 | 21.0 |
| Tegowet ® 510 (Wetting Agent) | 0.3 | 0.3 | 0.3 | 0.3 | 0.3 |
| BYK ® 018 (Defoamer) | 2.5 | 2.8 | 2.7 | 3.1 | 2.6 |

Tego Wet® 510 is available from Evonik; BYK® 018 is available from Byk; Mowiol® products are available from Kuraray; Sancure® 20041 is available from Lubrizol; Orgasol® 2001 EX D NAT is available from Arkema; and Raycat® 78 is available from Specialty Polymers.

Example 2

To simulate the conditions of a doublebacker section of a corrugator, a printed medium was dragged over a hot plate at a constant speed at temperatures up to about 350° F. Essentially, a printed medium was placed face down on the hot plate with a piece of single-face corrugate and proper weight behind it to simulate the pressure of the belts pushing a corrugate into the hot plates.

The coated media samples described in Example 1 (Samples A-E) were printed with a pigment based inkjet ink and then coated with a finishing varnish overcoat at about 2 gsm. The varnish overcoat was INXKote Water Base Preprint OPV AC9116 from Inx International Ink Co.

Table 2 below provides hot durability performance scores (1 to 5 scale, higher number indicating better durability) for samples tested at 350° F.

TABLE 2A

Hot Durability Performance

| | Sample | | | | |
|---|---|---|---|---|---|
| | A | B | C | D | E |
| High Tg Latex to Polyurethane Weight Ratio | 5.02 | 8.55 | 4.3 | 3 | 2.87 |
| Durability | 2 | 1.5 | 3 | 5 | 4 |

As can be seen by this data, durability was generally better when the High Tg Latex to Polyurethane Weight Ratio was less than 5. Additionally, though not shown in this data, it has also been found that the presence of polyurethane contributes to durability enhancement compared to examples where a High Tg latex is used alone. Thus, a weight ratio from 2:1 to 5:1 provided results with higher durability than instances where the weight ratio was greater than 5, or where the polyurethane is not present. The weight ratio of 8.55:1 found in Formulation 2 was considered to be near poor in durability performance (1=Poor to 5=Excellent), whereas the durability performance of Sample 4 was excellent at a 3:1 weight ratio of High Tg Latex to Polyurethane.

What is claimed is:

1. A pre-treatment coating composition, comprising:
   an evaporable liquid vehicle; and
   a pre-treatment coating matrix, comprising:
      from 5 wt % to 40 wt % multivalent metal salt,
      from 5 wt % to 20 wt % polyurethane,
      from 10 wt % to 50 wt % high Tg latex having Tg greater than 80° C.,
      from 0.5 wt % to 20 wt % water soluble binder, and
      from 3 wt % to 20 wt % wax having a melting point greater than 120° C.,
   wherein weight percentages of the pre-treatment coating matrix exclude the evaporable liquid vehicle content, and wherein the weight ratio of the high Tg latex to polyurethane is from 1:1 to 5:1.

2. The pre-treatment coating composition of claim 1, wherein the multivalent salt comprises $CaCl_2$.

3. The pre-treatment coating composition of claim 1, wherein the polyurethane is an aromatic polyurethane or an aliphatic polyurethane.

4. The pre-treatment coating composition of claim 1, wherein the high Tg latex comprises polyacrylate, polyvinyl styrene, ethylene vinyl acetate, styrene acrylic copolymer, polymethacrylate, polyacrylic acid, polymethacrylic acids, or mixtures thereof.

5. The pre-treatment coating composition of claim 1, wherein the water soluble binder comprises polyvinyl alcohol, modified polyvinyl alcohol, polyvinyl acetates, polyvinyl pyrrolidones, starch, modified starch, water soluble cellulose derivatives, polyacrylamides, casein, gelatin, soybean protein, conjugated diene copolymers, functional group-modified polymers, acrylic polymers, vinyl polymers, cationic polymers, synthetic resin binders, or mixtures thereof.

6. The pre-treatment coating composition of claim 1, wherein the wax comprises polyethylene, polypropylene, polyamide, polytetrafluoroethylene, carnuba, or mixtures thereof.

7. The pre-treatment coating composition of claim 1, wherein the melting point of the wax is greater than 140° C.

8. A print medium, comprising:
   a media substrate; and
   a pre-treatment coating matrix applied to the media substrate, the pre-treatment coating matrix, comprising:
      from 5 wt % to 40 wt % multivalent metal salt,
      from 5 wt % to 20 wt % polyurethane,
      from 10 wt % to 50 wt % high Tg latex having Tg greater than 80° C.,
      from 0.5 wt % to 20 wt % water soluble binder, and
      from 3 wt % to 20 wt % wax having a melting point greater than 120° C.,
   wherein the weight ratio of the high Tg latex to polyurethane is from 1:1 to 5:1.

9. The print medium of claim 8, wherein the wax particles have an average particle size from 100 nm to 100 µm, and wherein a portion of the wax particles have a particle size that is greater than a thickness provided by other components of the pre-treatment coating matrix applied to the media substrate, and wherein the wax particles in the pre-treatment coating matrix have an area density coverage in the range of 0.5% to 30%.

10. The print medium of claim 8, wherein the media substrate is offset coated paper.

11. The print medium of claim 8, wherein media substrate has a first side and a second side, wherein the first side is coated with the pre-treatment coated matrix, and wherein the second side is attached to a first side of a corrugated flute, and wherein a base paper is attached to a second side of the corrugated flute.

12. The print medium of claim 8, further comprising printed ink applied to the pre-treatment coated matrix, and wherein a varnish overcoat is applied over the printed ink and the pre-treatment coated matrix.

13. A method of preparing printed and corrugated packaging, comprising:
   coating a first side of media substrate with a pre-treatment coating composition, the pre-treatment coating composition, comprising evaporable liquid vehicle, multivalent metal salt, polyurethane, high Tg latex having a Tg greater than 80° C., water soluble binder, and wax having a melting point greater than 120° C., wherein the weight ratio of the high Tg latex to polyurethane is from 1:1 to 5:1;
   drying the pre-treatment coating to remove evaporable liquid vehicle therefrom to form a pre-treatment coating matrix applied the first side;
   applying a printed image on the pre-treatment coating;
   applying a varnish overcoat to the to the printed image and the pre-treatment coating matrix; and
   applying a first side of a corrugated flute to a second side of the media substrate.

14. The method of claim 13, wherein the corrugated flute further comprises a based paper applied a second side of the corrugated flute.

15. The method of claim 14, further comprising applying pressure to the base paper and applying heat and pressure to the varnish overcoat.

16. The pre-treatment coating composition of claim 1, wherein the weight ratio of the high Tg latex to polyurethane is from 2:1 to 5:1.

17. The print medium of claim 9, wherein at least 50% of the wax particles have an average particle size greater than the thickness of the matrix.

18. The method of claim 13, wherein the varnish overcoat includes polystyrene polymer, polystyrene copolymers, polyacrylate, polystyrene-acrylate copolymers, polyurethane resin, or heat cross-linkable polymers.

* * * * *